United States Patent
Oh et al.

(10) Patent No.: US 7,821,798 B2
(45) Date of Patent: Oct. 26, 2010

(54) HIGH VOLTAGE POWER SUPPLY

(75) Inventors: Chul-woo Oh, Suwon-si (KR); Jong-hwa Cho, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 451 days.

(21) Appl. No.: 11/872,219

(22) Filed: Oct. 15, 2007

(65) Prior Publication Data
US 2008/0225557 A1    Sep. 18, 2008

(30) Foreign Application Priority Data
Mar. 16, 2007    (KR) ...................... 10-2007-0026272

(51) Int. Cl.
*H02M 3/335*    (2006.01)
*H02H 7/122*    (2006.01)
(52) U.S. Cl. .................... 363/21.01; 363/41; 363/56.11
(58) Field of Classification Search .................. 363/16, 363/20, 21.01, 40, 41, 55, 56.01, 56.11, 56.12, 363/49, 79, 80, 97
See application file for complete search history.

(56) References Cited

U.S. PATENT DOCUMENTS

| | | | |
|---|---|---|---|
| 6,198,638 B1 * | 3/2001 | Lee | 363/21.14 |
| 6,801,068 B2 * | 10/2004 | Yin | 327/172 |
| 7,035,119 B2 * | 4/2006 | Koike | 363/19 |
| 7,088,597 B2 * | 8/2006 | Cho | 363/21.01 |
| 2005/0259448 A1 * | 11/2005 | Koike | 363/21.01 |
| 2006/0092672 A1 * | 5/2006 | Cho et al. | 363/21.01 |

* cited by examiner

*Primary Examiner*—Jessica Han
(74) *Attorney, Agent, or Firm*—Stanzione & Kim LLP

(57) ABSTRACT

Provided is a high voltage power supply which includes a controller to provide a PWM signal and a power signal, an input unit to receive the PWM signal provided from the controller, a comparison unit to control output of the power signal supplied from the controller by comparing a signal filtered to a DC voltage by the input unit to a voltage reference signal, a transformation unit to transform the power signal output from the comparison unit, and a rectification unit to rectify the signal output by the transformation unit, wherein the high voltage power supply further includes a power input delay unit to delay the supply of the power signal to the comparison unit by a predetermined time from when the power supplied from the controller for input into the comparison unit. The high voltage power supply can prevent components of a device from being damaged due to sudden voltage surge in an output power output from an output terminal, which can occur when a time at which a PWM signal is transitioned to a HIGH state. The power signal is delayed with respect to a time at which a high voltage driving power 24 [V] is initially supplied.

21 Claims, 4 Drawing Sheets

ABNORMAL OUTPUT OCCURRENCE $T_1$   $T_2$ $T_3$ $T_4$

HIGH VOLTAGE POWER SUPPLY

CROSS-REFERENCE TO RELATED APPLICATIONS

This application claims the benefit of Korean Patent Application No. 10-2007-0026272, filed on Mar. 16, 2007, in the Korean Intellectual Property Office, the disclosure of which is incorporated herein in its entirety by reference.

BACKGROUND OF THE INVENTION

1. Field of the Invention

The present general inventive concept relates to a high voltage power supply (HVPS) that is used in a laser printer or a laser replicator, and more particularly, to a HVPS to prevent abnormal operation, which can occur when power is initially supplied, and where a sudden overshoot phenomenon can occur in an output voltage.

2. Description of the Related Art

A high voltage power supply (HVPS) is a device that receives input voltages (5 [V], 24 [V] or the like) from a switching mode power supply (SMPS) and a main board and generates and outputs high voltages required for forming an image of a transcription process according to a pulse width modulation (PWM) signal of a controller. The HVPS transforms a DC input voltage of 24 [V] into a high voltage in the range of several hundreds to several thousands of volts using a transformer, and outputs the voltage.

FIG. 1 is a circuit view illustrating a conventional HVPS. Referring to FIG. 1, a controller 10 outputs a power signal of 24 [V] and a PWM signal. An input unit 20 converts the PWM signal provided from the controller 10 into a DC voltage using a RC low pass filter. A comparison unit 30 controls output of the power signal of 24 [V] by comparing the DC voltage output signal of the RC low pass filter to a reference voltage signal. A transformation unit 40 converts the output signal of the comparison unit 30 into a transistor driving signal and transforms the converted driving signal into a high voltage type signal. A rectification unit 50 rectifies the high voltage type signal of the transformation unit 40 and finally outputs a high voltage signal of a DC type. The final output high voltage DC signal stabilizes the output of the rectification unit 50 using feedback to the comparison unit 30.

The controller 10 provides the PWM signal using a logic control signal of 5 [V] and the power signal of 24[V] when power is to be supplied to office automation (OA) devices by the HVPS. When the PWM signal provided from the controller 10 does not maintain a logic HIGH state when the power signal of 24 [V] is first input, the PWM signal is instantly detected as a LOW state and a high voltage peak is suddenly generated in a high voltage DC signal output. This phenomenon negatively influences each device in which a HVPS is used to supply power. In particular, when a HVPS is used to supply power in an image forming apparatus, this phenomenon negatively affects the lifetime of a high voltage roller and the formation of an image.

SUMMARY OF THE INVENTION

The present general inventive concept provides a high voltage power supply that prevents a sudden overshoot phenomenon of a high output voltage, which can occur at the time when a PWM signal that transitions into a HIGH state is delayed with respect to the time when power is initially supplied.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a high voltage power supply which includes a controller to provide a PWM (pulse width modulation) signal and a power signal, an input unit to receive the PWM signal provided from the controller, a comparison unit to control the power signal provided by the controller by comparing the received PWM signal filtered to a DC voltage level by the input unit to a reference voltage signal and to provide a controlled output power signal, a transformation unit to transform the controlled output power signal output from the comparison unit into a high voltage output signal, and a rectification unit to rectify the high voltage output signal output from the transformation unit into a high voltage DC signal, wherein the high voltage power supply further includes a power input delay unit to receive the power signal from the controller and to delay the output of the power signal to the comparison unit by a predetermined time from when the power signal is initially provided by the controller for input into the comparison unit.

The controller may output a logic control signal, used to generate the PWM signal, to the power input delay unit and to control the delay of the power signal in the power input delay unit.

The power input delay unit may include: a first transistor becoming activated when the logic control signal is provided from the controller; and a second transistor becoming activated when the first transistor is activated, wherein the power signal supplied from the controller is input into the comparison unit by activating the second transistor.

The first transistor may be an NPN transistor.

A base of the first transistor may be connected to an output terminal of the controller which supplies the logic control signal, an emitter of the first transistor is grounded, and a collector of the first transistor is connected to a base of the second transistor.

The second transistor may be a PNP transistor.

A base of the second transistor may be connected to a collector of the first transistor, an emitter of the second transistor is connected to an output terminal of the controller which supplies the power signal, and a collector of the second transistor is connected to an input of the comparison unit.

The high voltage power supply may be operated to cause the power signal to be input to the comparison unit a predetermined amount of time after the power signal is initially provided by the controller.

The high voltage power supply is included in an image forming apparatus.

The high voltage power supply wherein the power signal is output from the power input delay unit substantially immediately prior to the transition of the received PWM signal to a logic HIGH state.

The foregoing and/or other aspects and utilities of the present general inventive concept are achieved by a method of operating a high voltage power supply (HVPS), including receiving a PWM signal and a power signal, controlling the received power signal by comparing the received PWM signal to a reference voltage signal and outputting a controlled output power signal, transforming the outputted controlled output power signal into a high voltage output signal, rectifying the high voltage output signal into a high voltage DC signal, and delaying the outputting of the controlled output power signal by a predetermined time after the power signal is initially received.

The method may also include utilizing a logic control signal to provide the received PWM signal.

The method of operating wherein the controlled output power signal may be outputted at a predetermined time after the power signal is initially received.

The method of operating wherein the controlled output power signal is delayed until a time immediately prior to the transition of the received PWM signal to a logic HIGH state.

The foregoing and/or other aspects and utilities of the present general inventive concept are achieved by a high voltage power supply which includes a controller to provide a PWM (pulse width modulation) signal and a power signal, an input unit to receive the PWM signal provided by the controller and to filter the PWM signal to a DC voltage level, a comparison unit to control the power signal provided by the controller by comparing the filtered PWM signal to a reference voltage signal and to output a controlled output power signal, a transformation unit to transform the controlled output power signal output from the comparison unit into a high voltage DC output signal, and a power input delay unit to receive the controller provided power signal and a logic control signal and to delay the output of the power signal to the comparison unit.

The high voltage power supply wherein the power input delay unit includes a plurality of transistor devices configured to control the flow of the power signal provided by the controller unit to the comparison unit.

The high voltage power supply wherein the transistor devices are connected in series.

The high voltage power supply wherein at least one of the transistor devices is a NPN transistor and at least one other is a PNP transistor.

The foregoing and/or other aspects and utilities of the present general inventive concept are achieved by a high voltage power supply which includes a power input delay unit to receive a power signal and a logic control signal and to delay the output of the received power signal, an input unit to receive a pulse width modulation (PWM) signal and to filter the PWM signal to a DC voltage level, a comparison unit to receive the delayed received power signal from the power input delay unit and to control the delayed received power signal by comparing the filtered PWM signal to a reference voltage signal and to output a controlled output power signal, a transformation unit to transform the controlled output power signal output from the comparison unit into a high voltage output signal, and a rectification unit to rectify the high voltage output signal output from the transformation unit into a high voltage DC level output.

The high voltage power supply wherein the power input delay unit delays the output of the received power until immediately prior to a transition of the PWM signal to a logic HIGH state.

The foregoing and/or other aspects and utilities of the present general inventive concept are achieved by a high voltage power output delay device which includes a power delay input unit to receive a power signal and to receive a logic control signal and to utilize the logic control signal to delay the output of a delayed power signal, a comparison unit to receive the delayed power signal to receive a filtered DC level pulse width modulation (PWM) signal and to control the delayed power signal by comparing the filtered PWM signal to a voltage reference signal, wherein the delayed power signal is output to the comparison unit immediately prior to the time the PWM signal transitions to a logic HIGH status, and wherein the delayed power signal is transformed into a high voltage signal to be output.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
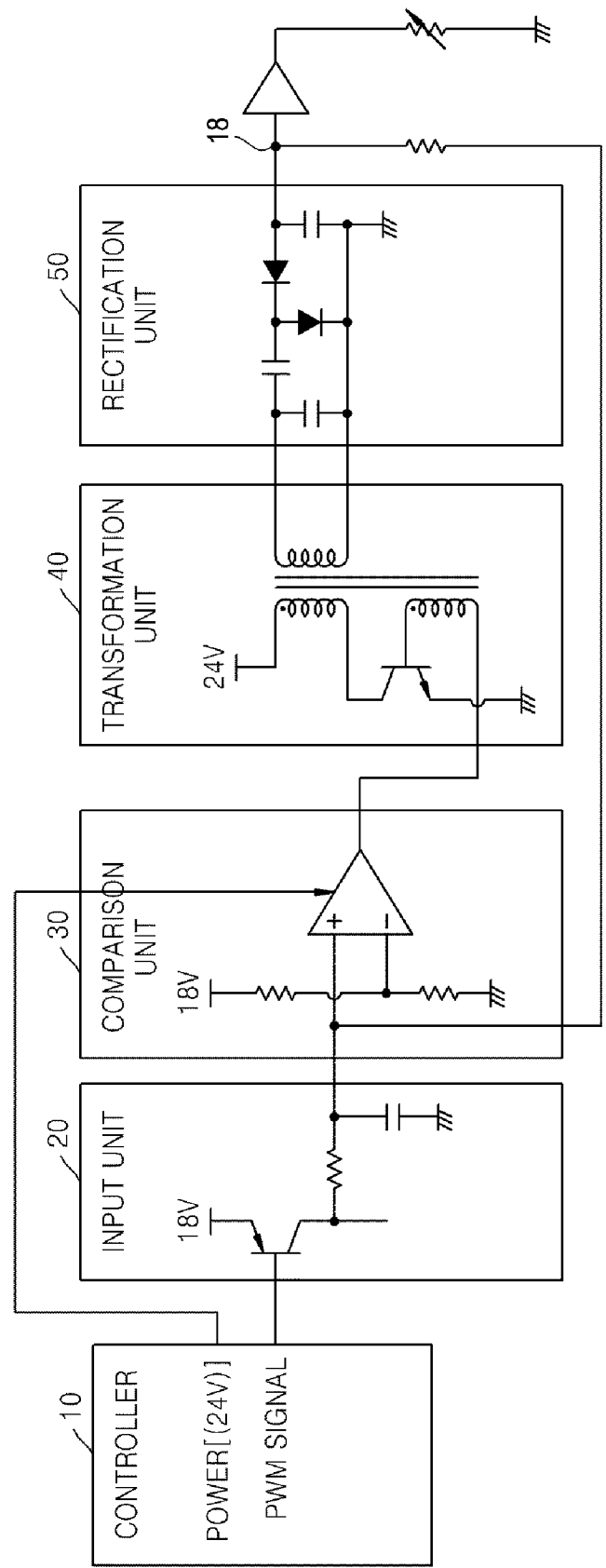
FIG. 1 is a circuit view illustrating a conventional high voltage power supply (HVPS)

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
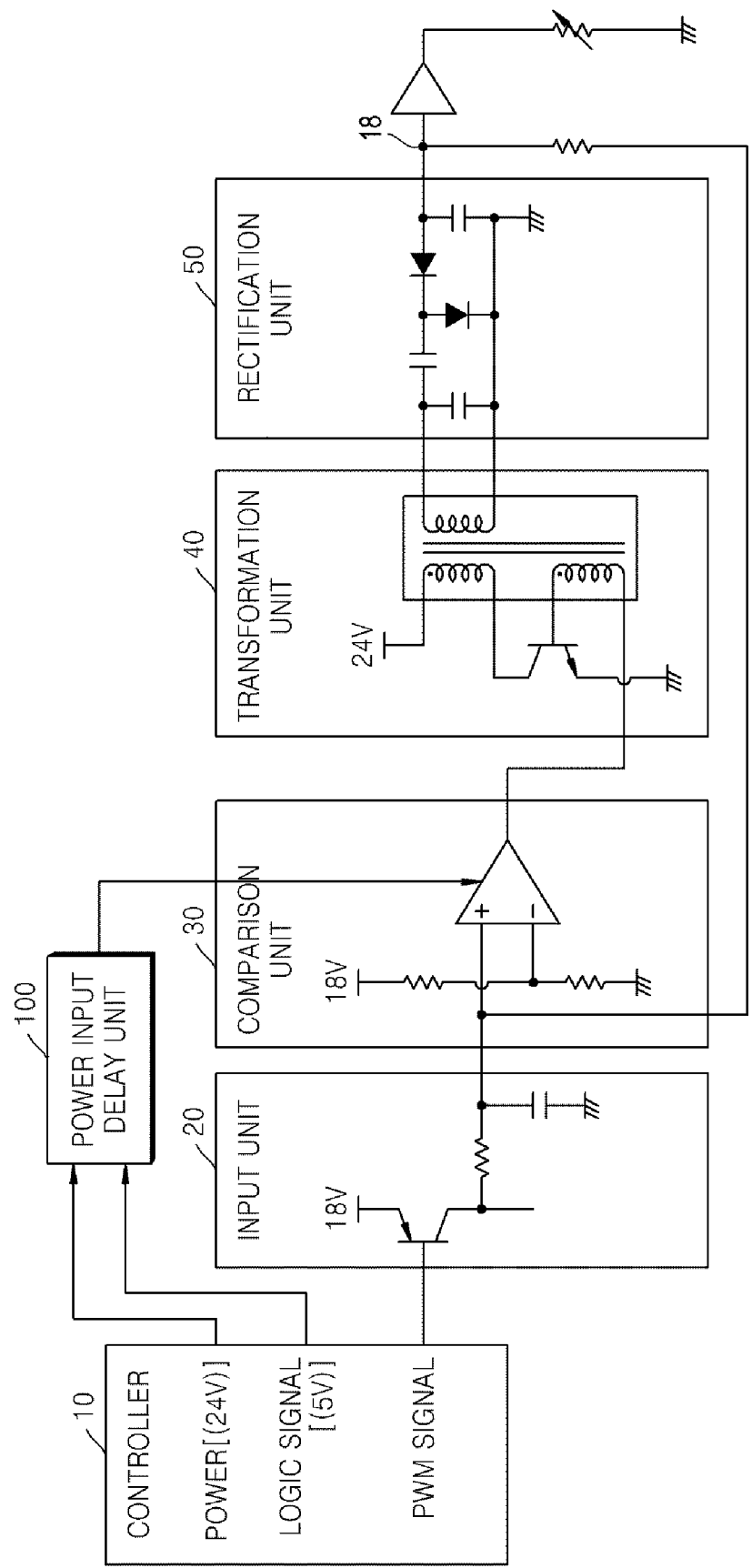
FIG. 2 is a circuit view of a HVPS according to an embodiment of the present general inventive concept.

FIG. 2 is a circuit view of a high voltage power supply (HVPS) according to an embodiment of the present general inventive concept.

Elements illustrated in FIG. 2, which are respectively numbered the same as those illustrated in FIG. 1, are generally described in the background section herein, and now will be described in detail. A controller 10 provides a pulse width modulation (PWM) signal and power signal (e.g. 24 [V]) that are generated by using a logic control signal (e.g. 5 [V]). An input unit 20 receives the PWM signal provided from the controller 10, and converts the PWM signal into a DC voltage output signal using a RC low pass filter. A comparison unit 30 controls the output of the power signal (e.g. 24[V]) supplied from the controller 10 by comparing the DC voltage output signal output from the input unit 20 to a reference voltage signal. A transformation unit 40 transforms the controlled output power signal of the comparison unit 30 into a high voltage output signal. A rectification unit 50 rectifies the high voltage output signal of the transformation unit 40 and finally outputs a high voltage signal of DC type.

According to embodiments of the present general inventive concept, the HVPS includes a power input delay unit 100 that delays the power signal (e.g. 24 [V]) which is to be input into the comparison unit 30, by a predetermined amount of time, when the power signal (e.g. 24 [V]) supplied from the controller 10 is input into the power input delay unit 100.

In this case, the controller 10 outputs the logic control signal (e.g. 5 [V]) which is used to generate the PWM signal output from controller 10, as well as the power signal (e.g. 24 [V]).

Figure 3:
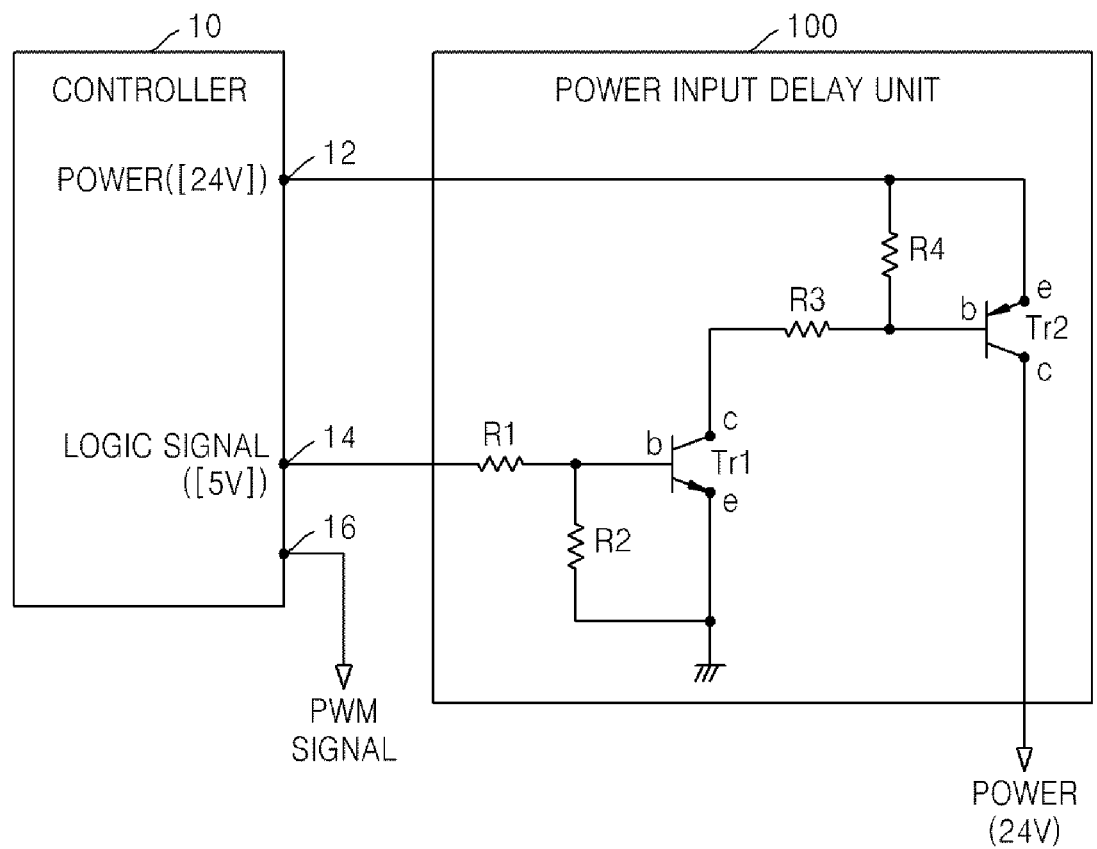
FIG. 3 is a circuit view illustrating an embodiment of the power input delay unit illustrated in FIG. 2.

FIG. 3 is a circuit view illustrating the power input delay unit 100 illustrated in FIG. 2.

Referring to FIG. 3, the controller 10 outputs the power signal (e.g. 24 [V]) into the power input delay unit 100 via a first terminal 12, and outputs the logic control signal (e.g. 5 [V]) into the power input delay unit 100 via a second terminal 14. Meanwhile, the controller 10 generates the PWM signal using the logic control signal (e.g. 5 [V]), and outputs the PWM signal to the input unit 20 via a third terminal 16.

The power input delay unit 100 of this embodiment includes a first transistor Tr1, a second transistor Tr2 and a plurality of resistors R1, R2, R3 and R4.

The first transistor Tr1 is activated when the logic control signal (e.g. 5 [V]) is provided from the controller 10. In this case, the first transistor Tr1 may be an NPN transistor, as illustrated in FIG. 3. The base of the first transistor Tr1 is connected to the second terminal 14 of the controller 10 which supplies the logic control signal (e.g. 5 [V]). The resistor R1 is connected between the second terminal 14 and the base. The emitter of the first transistor Tr1 is grounded. Furthermore, the resistor R2 is connected between the base and the emitter of the first transistor Tr1. The collector of the first transistor Tr1 is connected to the base of the second transistor Tr2. The resistor R3 is connected between the collector of the first transistor Tr1 and the base of the second transistor Tr2.

The second transistor Tr2 is activated when the first transistor Tr1 is activated. In this case, the second transistor Tr2 may be a PNP transistor, as illustrated in FIG. 3. The base of the second transistor Tr2 is connected to the collector of the first transistor Tr1. The emitter of the second transistor Tr2 is connected to the first terminal 12 of the controller 10 which supplies the power signal (e.g. 24 [V]). In addition, the resistor R4 is connected between the base and the emitter of the second transistor Tr2. The collector of the second transistor Tr2 is connected to the comparison unit 30, as illustrated in FIG. 2.

Operations of the first transistor Tr1 and the second transistor Tr2, under the control of the logic control signal, will now be described. Since the base of the first transistor Tr1 maintains a logic LOW state when the logic control signal (e.g. 5 [V]) from controller 10 is not provided into the first transistor Tr1, which is an NPN transistor, the collector and the emitter of the first transistor Tr1 maintain an interrupted state. Since the base of the second transistor Tr2, which is a PNP transistor, maintains a logic HIGH state when the collector and the emitter of the first transistor Tr1 maintains the interrupted state, the emitter and the collector of the second transistor Tr2 both maintain an interrupted state.

However, since the base of the first transistor Tr1 maintains the logic HIGH state when the logic control signal (e.g. 5 [V]) is provided by controller 10 into the first transistor Tr1, the collector and the emitter of the first transistor Tr1 maintain the activated state. Furthermore, since the base of the second transistor Tr2 maintains the logic LOW state when the collector and the emitter of the first transistor Tr1 maintain the activated state, the emitter and the collector of the second transistor Tr2 also maintain the activated state. The power signal (e.g. 24 [V]) supplied from the controller 10 is output into the comparison unit 30 by activation of the second transistor Tr2.

Figure 4A:
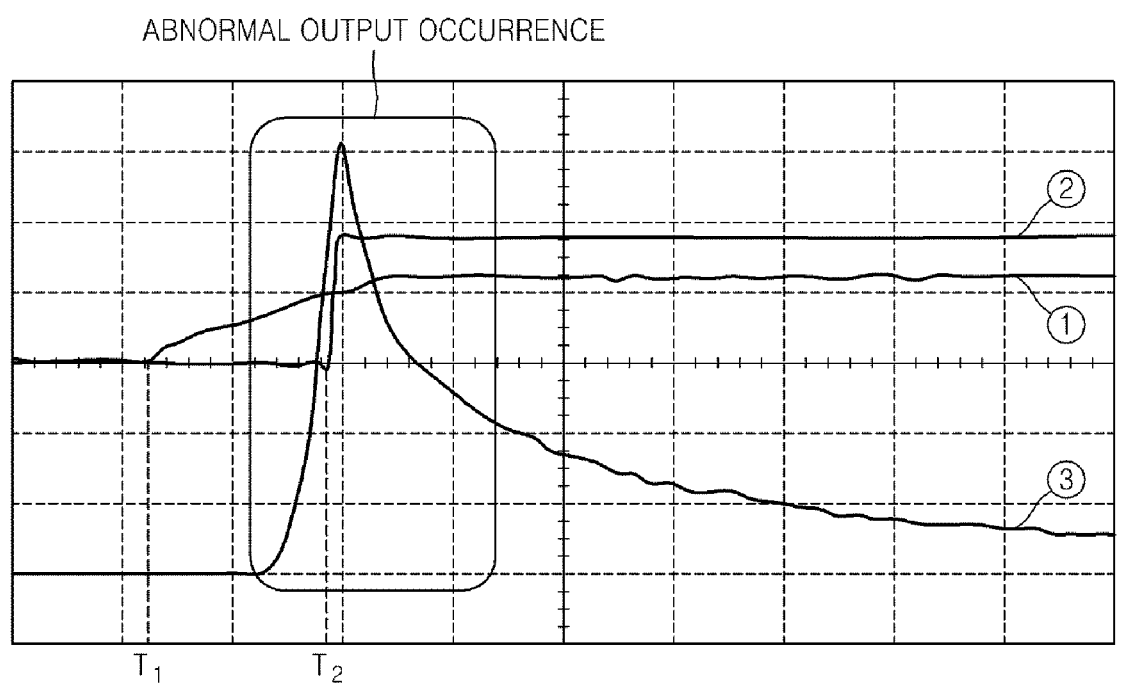
FIGS. 4A and 4B are, respectively, a graph of signals of a conventional HVPS, and a graph of signals of a HVPS according to an embodiment of the present general inventive concept.
Figure 4B:
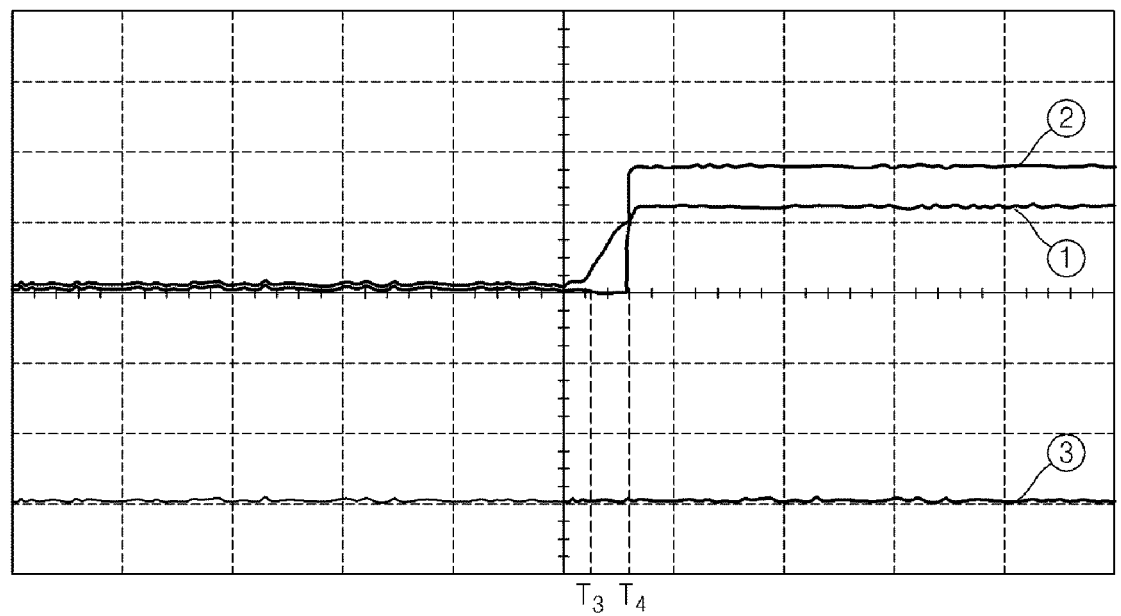

FIGS. 4A and 4B illustrate a comparison of the signal that effect a HVPS according to an embodiment of the present invention (FIG. 4B), with the signals that effect a conventional HVPS (FIG. 4A).

FIG. 4A is a graph illustrating a change of an output voltage ③ output from an output terminal 18 of a conventional HVPS when power is supplied to the HVPS. Referring to FIG. 4A, at time T1, a power signal ① is supplied, where time T1 is substantially earlier than a time T2, where the PWM signal ② transitions from a logic LOW state to a logic HIGH state, and thus sudden overshoot can be seen in the output voltage signal ③ output from the output terminal 18 of the HVPS.

FIG. 4B is a graph illustrating a change of an output voltage ③ output from the output terminal 18 of the HVPS according to the current embodiment when power is supplied to the HVPS. Referring to FIG. 4B, it can be seen that at a time T3, the power signal ① of is supplied, which is delayed in time with respect to the time T1 when the power signal ① of (FIG. 4A is supplied. This is because the power input delay unit 100 delays the power signal ① of FIG. 4B by a predetermined time after power signal ① is initially supplied by controller 10 to be input into the comparison unit 30. Since the time T3, when the power signal ① is supplied, is not substantially earlier than time T4 when the PWM signal ② of FIG. 4B transitions from the logic LOW state to the logic HIGH state, sudden overshoot of the output voltage signal ③ of the output terminal 18 of the HVPS does not occur, unlike in the conventional HVPS.

According to the present general inventive concept, unlike the conventional HVPS operation of FIG. 4A, the HVPS is operated at substantially the same time that the initial power is supplied. This is because overshoot of the output voltage signal ③ is likely to occur in the HVPS output terminal 18, as illustrated in FIG. 4A, if the initial power is supplied substantially earlier than the transition of the PWM signal ② of FIG. 4B to a logic HIGH state.

The HVPS may be included in an image forming apparatus.

Components such as a roller or the like are likely to be damaged due to sudden overshoot of the output voltage signal in an image forming apparatus, in particular, in devices such as a printer and a replicator in which a high voltage is used. Accordingly, the HVPS according to the present general inventive concept is used in the image forming apparatus, and thus its components can be prevented from being damaged.

The HVPS according to the present general inventive concept is a protective device for minimizing a negative affect on each roller circuit and other components of an image forming apparatus by controlling an output power signal when an input power signal is initially supplied. In addition, by using a simple architecture, the HVPS can prevent components of a device from being damaged due to a sudden voltage surge in an output voltage of output terminal 18 of the device, which can occur at the time the PWM signal transitions to a logic HIGH state. The voltage surge is prevented by operation of the logic control signal causing the power signal 24 [V] to be supplied to comparison unit 30, wherein it is delayed by the logic control signal until a time immediately prior to the time the PWM signal transitions to a logic HIGH state.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A high voltage power supply, comprising:
   a controller to provide a PWM (pulse width modulation) signal and a power signal;
   an input unit to receive the PWM signal provided from the controller;
   a comparison unit to receive the power signal provided by the controller and to compare the received PWM signal filtered to a DC voltage level by the input unit to a reference voltage signal and to provide an output power signal;
   a transformation unit to transform the output power signal, output from the comparison unit, into a high voltage output signal; and
   a rectification unit to rectify the high voltage output signal output from the transformation unit into a high voltage DC signal,
   wherein the high voltage power supply further includes a power input delay unit to receive the power signal from the controller and to delay the output of the power signal to the comparison unit by a predetermined time from when the power signal is initially provided by the controller for input into the comparison unit.

2. The high voltage power supply of claim 1, wherein the controller outputs a logic control signal used to generate the PWM signal to the power input delay unit to control the delay of the power signal in the power input delay unit.

3. The high voltage power supply of claim 2, wherein the power input delay unit comprises:
a first transistor becoming activated when the logic control signal is provided from the controller; and
a second transistor becoming activated when the first transistor is activated,
wherein the power signal supplied from the controller is input into the comparison unit by activating the second transistor.

4. The high voltage power supply of claim 3, wherein the first transistor is an NPN transistor.

5. The high voltage power supply of claim 4, wherein a base of the first transistor is connected to an output terminal of the controller which supplies the logic control signal, an emitter of the first transistor is grounded, and a collector of the first transistor is connected to a base of the second transistor.

6. The high voltage power supply of claim 3, wherein the second transistor is a PNP transistor.

7. The high voltage power supply of claim 6, wherein a base of the second transistor is connected to a collector of the first transistor, an emitter of the second transistor is connected to an output terminal of the controller which supplies the power signal, and a collector of the second transistor is connected to an input of the comparison unit.

8. The high voltage power supply of claim 1, wherein the high voltage power supply is operated to cause the power signal to be input to the comparison unit a predetermined amount of time after the power signal is initially provided by the controller.

9. The high voltage power supply of claim 1, wherein the high voltage power supply is included in an image forming apparatus.

10. The high voltage power supply of claim 1, wherein the power signal is output from the power input delay unit substantially immediately prior to the transition of the received PWM signal to a logic HIGH state.

11. A method of operating a high voltage power supply (HVPS), comprising:
receiving a PWM signal and a power signal from a controller;
comparing the received PWM signal to a reference voltage signal through a comparison unit receiving a driving power signal and outputting an output power signal, wherein the driving power signal, which is delayed by a predetermined time after the power signal is initially received, is output to the comparison unit;
transforming the outputted controlled output power signal into a high voltage output signal; and
rectifying the high voltage output signal into a high voltage DC signal.

12. The method of claim 11, further comprising utilizing a logic control signal to provide the received PWM signal.

13. The method of claim 12, wherein the output power signal is outputted at a predetermined time after the power signal is initially received.

14. The method of claim 12, wherein the output power signal is delayed until a time immediately prior to the transition of the received PWM signal to a logic HIGH state.

15. A high voltage power supply, comprising:
a controller to provide a PWM (pulse width modulation) signal and a power signal;
an input unit to receive the PWM signal provided by the controller and to filter the PWM signal to a DC voltage level;
a comparison unit to receive the power signal provided by the controller and compare the filtered PWM signal to a reference voltage signal, and to output a output power signal;
a transformation unit to transform the output power signal output from the comparison unit into a high voltage output signal;
a rectification unit to rectify the high voltage output signal from the transformation unit into a high voltage DC output signal; and
a power input delay unit to receive the power signal and a logic control signal provided from the controller and to delay the output of the power signal to the comparison unit.

16. The high voltage power supply of claim 15, wherein the power input delay unit includes a plurality of transistor devices configured to utilize the logic control signal to control the flow of the power signal from the controller to the comparison unit.

17. The high voltage power supply of claim 16, wherein the transistor devices are connected in series.

18. The high voltage power supply of claim 16, wherein at least one of the transistor devices is a NPN transistor and at least one other is a PNP transistor.

19. A high voltage power supply, comprising:
a power input delay unit to receive a power signal and a logic control signal and to delay the output of the received power signal;
an input unit to receive a pulse width modulated (PWM) signal and to filter the PWM signal to a DC voltage level;
a comparison unit to receive the delayed received power signal from the power input delay unit, and to compare the filtered PWM signal to a reference voltage signal, and to output a controlled output power signal;
a transformation unit to transform the output power signal output from the comparison unit into a high voltage output signal; and
a rectification unit to rectify the high voltage output signal output from the transformation unit into a high voltage DC level output.

20. The high voltage power supply of claim 19, wherein the power input delay unit delays the output of the received power signal until immediately prior to a transition of the PWM signal to a logic HIGH state.

21. A high voltage power output delay device, comprising:
a power input delay unit to receive a power signal, to receive a logic control signal and to utilize the logic control signal to delay output of a delayed power signal;
a comparison unit to receive the delayed power signal, to receive a filtered DC level pulse width modulation (PWM) signal, and to compare the filtered PWM signal to a voltage reference signal;
wherein the delayed power signal is output to the comparison unit immediately prior to the time the PWM signal transitions to a logic HIGH state; and
wherein the delayed power signal is transformed into a high voltage signal to be output.

* * * * *